US008042816B2

(12) United States Patent
Krausz et al.

(10) Patent No.: US 8,042,816 B2
(45) Date of Patent: Oct. 25, 2011

(54) SEAL PROFILE

(75) Inventors: Eliezer Krausz, Tel-Aviv (IL); Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 108 days.

(21) Appl. No.: 11/716,643

(22) Filed: Mar. 12, 2007

(65) Prior Publication Data
US 2008/0029970 A1 Feb. 7, 2008

(30) Foreign Application Priority Data
Apr. 23, 2006 (IL) .......................................... 175107

(51) Int. Cl.
*F16L 17/035* (2006.01)
*F16L 17/025* (2006.01)
*F16L 33/18* (2006.01)

(52) U.S. Cl. ........ 277/607; 277/615; 285/369; 285/373; 285/112

(58) Field of Classification Search .................. 277/607, 277/615; 285/110, 112, 113, 369, 370, 345, 285/373
See application file for complete search history.

(56) References Cited

U.S. PATENT DOCUMENTS

| | | | | | |
|---|---|---|---|---|---|
| 1,867,891 | A | * | 7/1932 | Baillie | 277/616 |
| 2,980,449 | A | * | 4/1961 | Dunton | 277/615 |
| 3,057,408 | A | * | 10/1962 | Griffitts | 277/336 |
| 3,173,694 | A | * | 3/1965 | Nathan | 277/314 |
| 3,334,928 | A | * | 8/1967 | Schmunk | 285/110 |
| 3,573,871 | A | * | 4/1971 | Warner | 277/607 |
| 3,877,733 | A | * | 4/1975 | Straub | 285/105 |
| 4,174,125 | A | * | 11/1979 | Wyss | 285/110 |
| 4,298,206 | A | * | 11/1981 | Kojima | 277/626 |
| 4,346,922 | A | * | 8/1982 | Ohtsuga et al. | 285/109 |
| 4,362,323 | A | * | 12/1982 | Lodder et al. | 285/4 |
| 4,629,217 | A | * | 12/1986 | Straub | 285/112 |
| 4,641,858 | A | * | 2/1987 | Roux | 277/615 |
| 4,789,167 | A | * | 12/1988 | Housas | 277/616 |
| 4,824,148 | A | * | 4/1989 | Grabowski | 285/110 |
| 5,056,833 | A | * | 10/1991 | Webb et al. | 285/148.23 |
| 5,203,594 | A | * | 4/1993 | Straub | 285/112 |
| 5,248,169 | A | * | 9/1993 | Barbe et al. | 285/110 |
| 5,288,087 | A | * | 2/1994 | Bertoldo | 277/616 |
| 5,639,102 | A | * | 6/1997 | Ilesic | 277/607 |
| 6,293,556 | B1 | * | 9/2001 | Krausz | 277/549 |
| 7,243,955 | B2 | * | 7/2007 | Krausz et al. | 285/236 |
| 7,748,753 | B2 | * | 7/2010 | Krausz et al. | 285/373 |

* cited by examiner

*Primary Examiner* — Alison Pickard
(74) *Attorney, Agent, or Firm* — Dekel Patent Ltd.; David Klein

(57) ABSTRACT

The invention relates to the external sealing and joining of piping. More particularly, the invention provides an improved seal profile which is suitable for use inside pipe couplings. The invention provides a twin-lip seal profile particularly useful in combination with a pipe coupling, the seal comprising: a substantially flat base element, having a first (inner) face and a second (outer) face and two outer edges. Two spaced-apart support blocks projecting upwardly from the first face of the base element, each support block having an outer and an inner face. Two lip members projecting from the outer edges of the base element, the lip members overlapping and resting on the closest support block and leaving a hollow space between the base element, the lip member and the outer face of the support block. The seal profile being characterized in that the plane or line of contact between the lip member and the support block, when extended towards the center of the profile, slopes to more closely approach the substantially flat base element, thus forming a wedge-like effect when pressure is applied to the lip members, the wedge-like effect preventing undesired outward movement of the lip members.

3 Claims, 2 Drawing Sheets

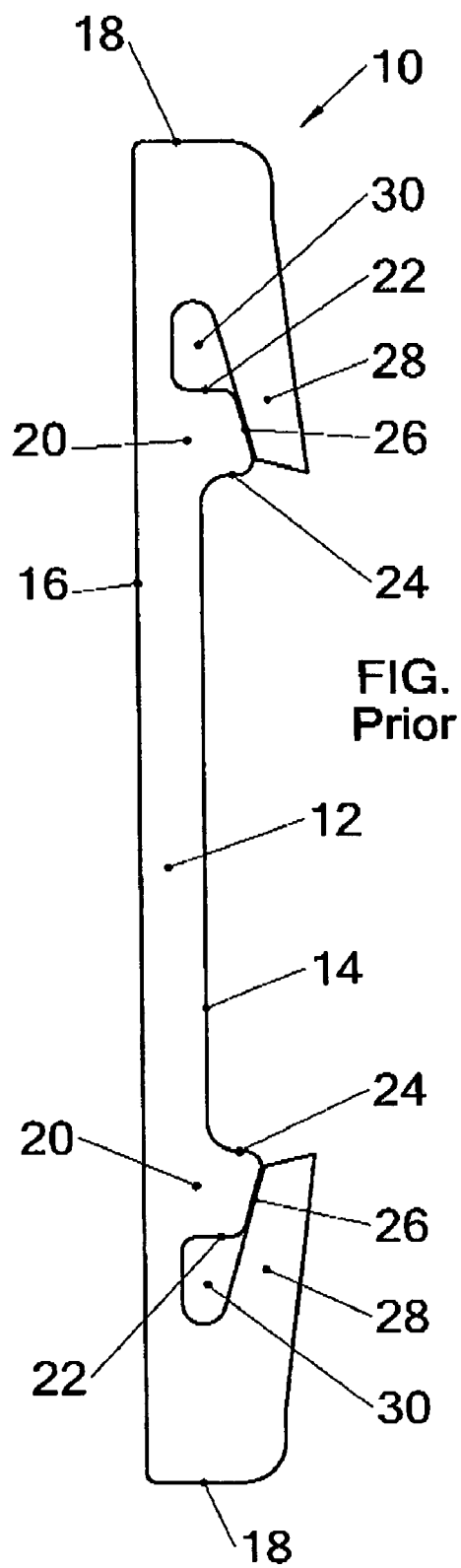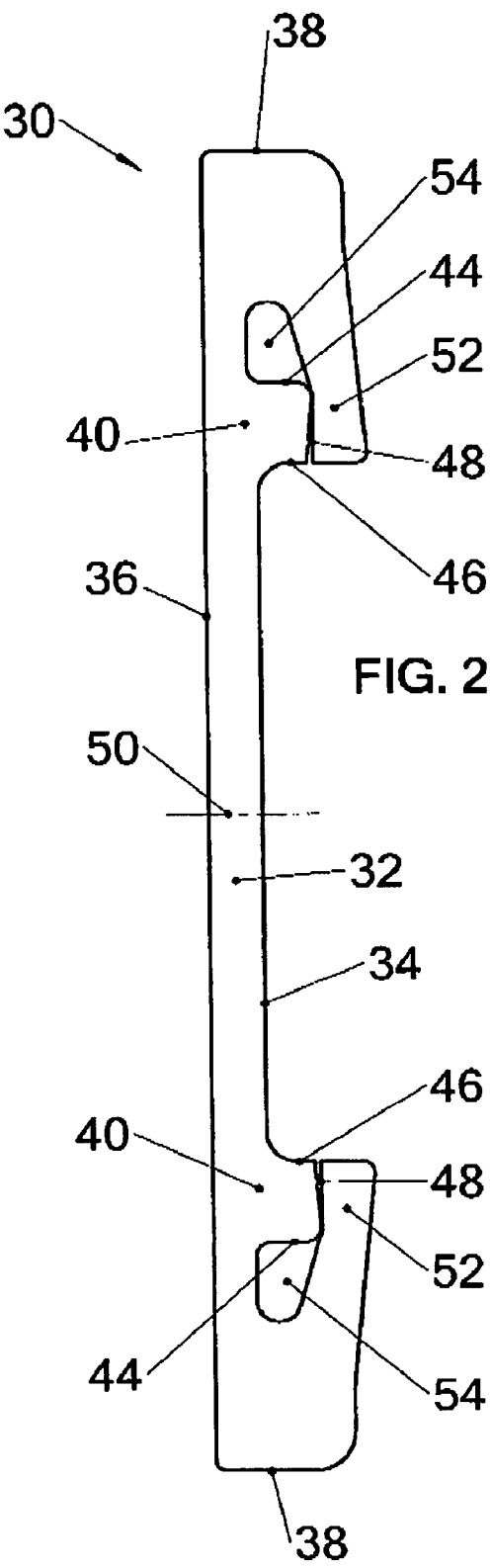

SEAL PROFILE

CROSS-REFERENCE TO RELATED APPLICATIONS

This application claims priority from IL Patent Application No. 175107, filed Apr. 23, 2006, which is hereby incorporated by reference.

FIELD AND BACKGROUND OF THE INVENTION

The present invention relates to the external sealing and joining of piping. More particularly, the invention provides an improved seal profile which is suitable for use inside pipe couplings.

A pipe coupling may be sealed by means of a pair of discrete seals proximate to each of the opposed axial faces of the coupling. Improved stability is however obtained when a single twin-lip seal is used. The wider seal costs somewhat more than a pair of short seals, but the added stability outweighs the added cost. Seals of both types are in common use. The profile of a typical prior art, two-lipped coupling seal will be described with reference to FIG. 1.

While the prior-art two-lipped coupling seals as described have served well in many applications, under some conditions, for example when a pipe being clamped moves axially outwards and/or when heavy pressure has been applied to the seal, it has been found that the seal lip moves axially outwards away from the pipe joint. Such undesired movement is encouraged by the slope of the outer face of the support block. This causes loss of sealing pressure and if continued leads to leakage of the fluid being transported in the pipeline.

OBJECT OF THE INVENTION

It is therefore the object of the present invention to obviate this disadvantage of prior art seals and to provide a seal profile which in use maintains the required sealing pressure against both pipes under all conditions during the normal lifetime of the seal.

In particular it is an object of the invention to provide a seal profile wherein the only possible form of axial movement of the lip members is inwards towards the mid-length of the coupling, and such movement is short being restricted by the body supporting the lip seal.

SUMMARY OF THE INVENTION

The present invention achieves the above objects by providing a twin-lip seal profile particularly useful in combination with a pipe couplings, the seal comprising:

a) a substantially flat base element, having a first (inner) face and a second (outer) face and two outer edges;

b) two spaced-apart support blocks projecting upwardly from said first face of said base element, each support block having an outer and an inner face;

c) two lip members projecting from said outer edges of said base element said lip members overlapping and resting on the closest support block and leaving a hollow space between said base element, said lip member and said outer face of said support block;

said seal profile being characterized in that the plane or line of contact between said lip member and said support block, when extended towards the center of said profile, slopes to more closely approach said substantially flat base element, thus forming a wedge-like effect when pressure is applied to said lip members, said wedge-like effect preventing undesired outward movement of said lip members.

In a preferred embodiment of the present invention there is provided a twin-lip seal profile further provided with at least one small projection on said plane or line of contact.

In a further preferred embodiment of the present invention there is provided a twin-lip seal profile extruded from Ethylene Propylene Diene Monomer.

It will be realized that the novel form of the seal of the present invention can be applied to a circular seal ready for use, and also to an endless strip which is cut off to length on site to meet sealing requirements which were unforeseen or for sealing pipes for which molded circular seals are unavailable.

SHORT DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the drawings:

FIG. 1 is a vertical elevational view of a prior art seal profile;

FIG. 2 is a vertical elevational view of the seal profile according to the invention;

DISCLOSURE OF THE INVENTION

Figure 3:
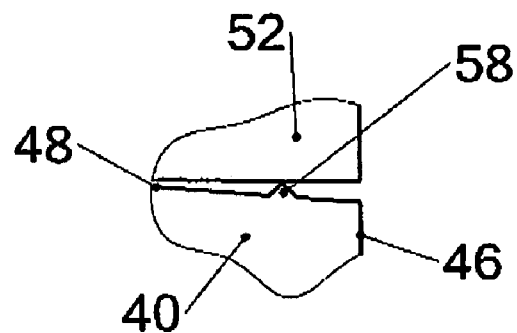
FIG. 3 is a detail view of a projection protruding from the support blocks.

There is seen in FIG. 1 a prior art profile 10.

The profile 10 has a substantially flat base element 12, having a first (inner) face 14 and a second (outer) face 16 and two outer edges 18.

Two spaced-apart support blocks 20 project upwardly from the first face 14 of the base element 12. Each support block 20 has an outer and an inner face 22, 24, and a top face 26 sloping downwards towards the nearest outer edge 18 of the profile.

Two lip members 28 project from the outer edges 18 of the base element 12. The lip members 28 overlap and rest on the adjacent support block 20 and leave a hollow space 30 at each side of the profile 10 between the base element 12, the lip member 28 and the face 22 of the support block 20.

Figure 4:
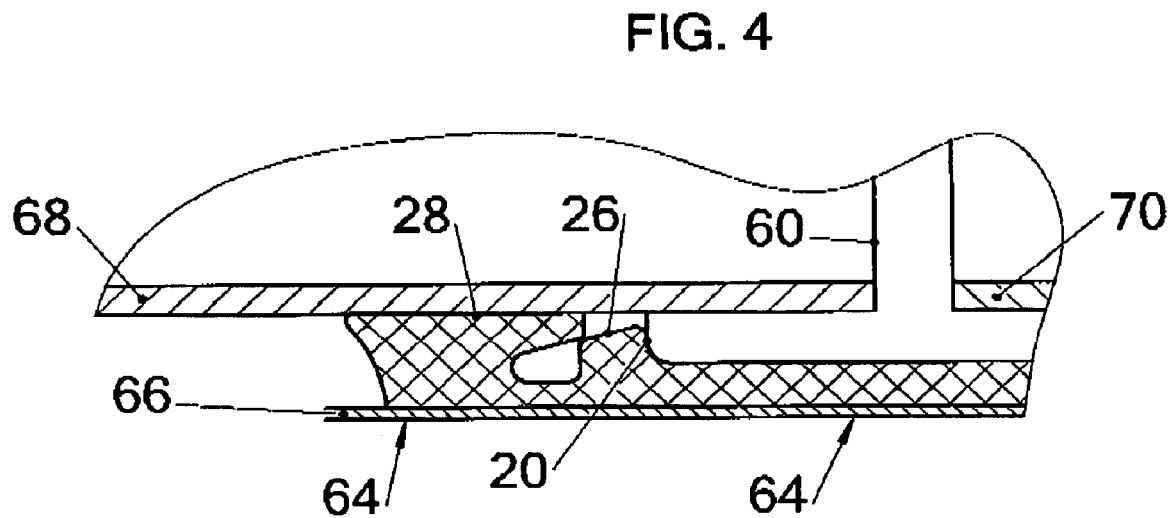
FIG. 4 is a sectioned detail view of a failure mode found in the prior art seal under high clamping pressure.

To illustrate a possible failure mode, a part of the prior art seal 10 will again be seen in FIG. 4, when the seal is under high clamp pressure.

Referring now to FIG. 2, there is seen a seal profile 30 according to the invention.

Again, the profile 30 has a substantially flat base element 32, having a first (inner) face 34 and a second (outer) face 36 and two outer edges 38.

Two spaced-apart support blocks 40 project from the first face 34 of the base element 32. Each support block 40 has an outer 44 and an inner face 46, and a top face 48, which is between parallel to the flat base element 32 to sloping downwards by about 5° towards the central portion 50 of the profile 30.

Two lip members 52 project from the outer edges 38 of the base element 32. The lip members 52 overlap and rest on the closest support block 40 and leave a hollow space 54 at each side of the profile 30 between the base element 32, the lip member 52 and the outer face 44 of the support block 40.

The lip members 52 stay in place horizontally or move slightly inwards when subjected to high clamp pressure, but remain firmly seated each on its support block 40.

FIG. 3 illustrates a further embodiment of the twin-lip seal.

The support blocks 40 are further provided with at least one small projection 58 on the upper face 48 thereof which serves as the plane or line of contact with the lip members 52. The projection 58 serves to ensure sealing even before full contact is made between the support block 40 and the lip member 52. The projection 58 is also useful in discouraging axial movement of the lip member 52 relative to the support block 40.

Seen in FIG. 4 is an illustration of a possible failure mode of the prior art seal 10 when the seal 10 is under high clamp pressure 64 between the coupling 66 and the pipes 68, 70.

The seal lip member 28 is seen having moved axially outwards away from the pipe joint 60. Such undesired movement is encouraged by the slope of the outer face 26 of the support block 20. This causes loss of sealing pressure and if continued leads to leakage of the fluid being transported in the pipes 68, 70.

The scope of the described invention is intended to include all embodiments coming within the meaning of the following claims. The foregoing examples illustrate useful forms of the invention, but are not to be considered as limiting its scope, as those skilled in the art will be aware that additional variants and modifications of the invention can readily be formulated without departing from the meaning of the following claims.

We claim:

1. A twin-lip seal profile particularly useful for use in combination with a pipe coupling for coupling pipes of substantially the same diameter, the seal profile comprising:

a) a substantially flat base element, having a first inner face and a second outer face and two outer edges;

b) two spaced-apart support blocks projecting outwardly from said first face of said base element, each support block having an outer face and an inner face, and a top face extending there between;

c) two lip members projecting from said outer edges of said base element, said lip members overlapping and resting on the closest support block and leaving a hollow space between said base element, said lip member and said outer face of said support block; wherein said inner face of said support blocks are closer to the center of said base element than said outer faces of said support blocks, wherein the top face of each of said support blocks slopes downward towards the central portion of said seal profile so that said inner face of each of said support blocks extends from the inner face of said flat base less than said outer face of each of said support blocks, and wherein a wedge-like effect is formed when pressure is applied to said lip members, said wedge-like effect preventing undesired outward movement of said lip members away from said central portion, and wherein said support blocks are further provided with at least one small projection on the tip face thereof which serves as a plane or line of contact with said lip members, said at least one small projection permitting full contact to be made between each of said support blocks and its corresponding lip member.

2. The twin-lip seal profile as claimed in claim 1, made of Ethylene Propylene Diene Monomer.

3. The twin-lip seal profile as claimed in claim 1, wherein said top face of each of said support blocks is between parallel to said flat base element to sloping downwards by about 5° towards the central portion of said seal profile.

* * * * *